Oct. 17, 1961  M. G. DREYFUS  3,004,664
METHOD AND APPARATUS FOR OPTICAL ANALYSIS
OF A MIXTURE OF SUBSTANCES
Filed July 9, 1957
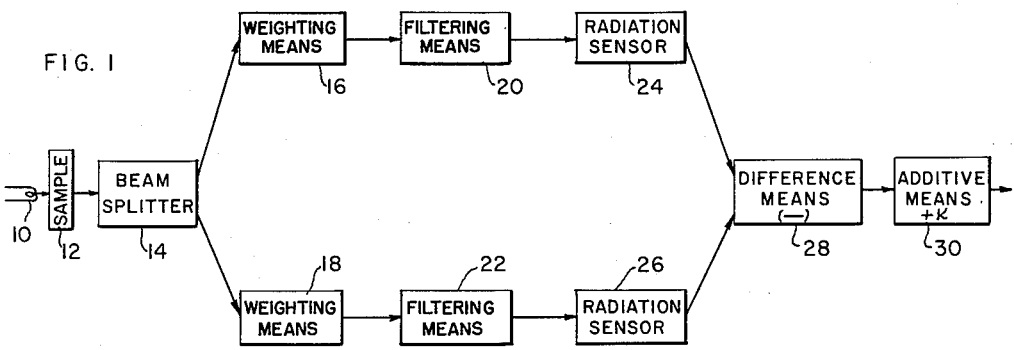
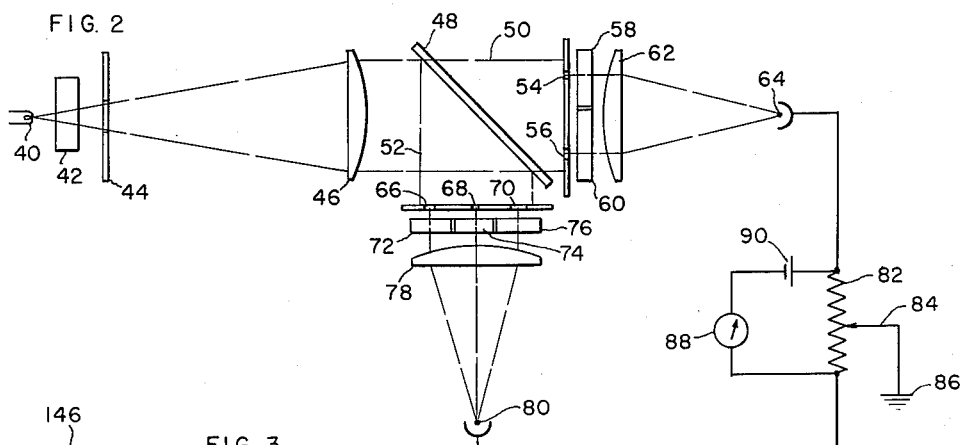
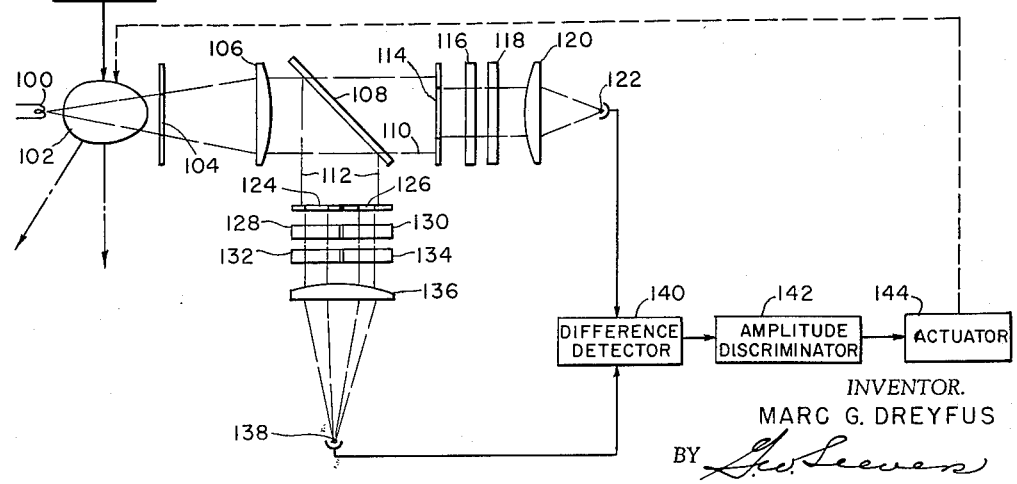
INVENTOR.
MARC G. DREYFUS
BY
ATTORNEY United States Patent Office 3,004,664
Patented Oct. 17, 1961

3,004,664
METHOD AND APPARATUS FOR OPTICAL ANALYSIS OF A MIXTURE OF SUBSTANCES
Marc G. Dreyfus, Van Nuys, Calif., assignor to General Precision, Inc., a corporation of Delaware
Filed July 9, 1957, Ser. No. 670,694
4 Claims. (Cl. 209—111.5)

This invention relates to a method and apparatus for determining the presence and concentration of a particular substance in a mixture of substances, and more particularly to a new and improved method and apparatus for determining thhe presence and concentration of a particular substance in a mixture of substances by means of comparing the intensities of radiations passed through the mixture at a plurality of different wavelengths.

Analysis for a particular substance by absorption spectrometry would be relatively simple if two idealized requirements for its operation were satisfied; first, a convenient absorption wavelength uniquely characteristic of the substance involved must exist, and second, a stable reference wavelength for comparison with the sensitive wavelength must also exist. These idealized conditions are often not present in practical situations since other substances present in a mixture often have absorption bands which spectrally overlap the absorption bands of the particular substance to be detected, and interfere with and confuse its concentration measurement.

When such spectral interferences or overlappings have been found to exist in a mixture, one method in the prior art for the determination of the concentration of the substance of interest has involved taking a series of measurements of the transmittance of the mixture at particular wavelengths with a spectrophotometer, and performing involved digital calculations using these measured values. This procedure is slow because of the serial nature of the measurements; it involves complex instrumentation and yields only intermittent concentration determinations.

Another method in the prior art has involved comparing the total transmittance of a broad range of wavelengths by the mixture under analysis with the total transmittance of a similar wavelength range by a reference standard. The reference standard is composed of a mixture of substances with a complex absorption spectrum. This method also has disadvantages. These include a dependence on the existence of a molecular spectral absorption having characteristics suitable to the mixture at hand, the vulnerability of the molecular absorption characteristics to environmental changes, and the obvious need for an extensive library of varied molecular absorption characteristics as well as ingenuity and skill in the selection and combination of said characteristics.

One object of this invention is to provide a method and apparatus for detecting the presence and concentration of one substance in a mixture, which method makes use of a plurality of radiation wavelength bands, each of which is of a chosen bandwidth, intensity, and spectral location, in order to compensate for interfering spectral overlap due to other substances in the mixture.

A further object of this inventtion is to provide a method and apparatus which detects and analyzes all of the radiation bands used simultaneously, and instantaneously determines the concentration of one particular substance. The method contemplated in this invention avoids the time loss and instrumental complexity involved in sequential detection of the individual radiation bands and in digital calculation of the results, and makes possible more rapid, reliable analysis and control.

A further object of this invention is to provide a method and apparatus for determining the presence and concentration of one substance in a mixture, which method does not require a standard reference for each determination.

A further object of this invention is to provide a method and apparatus for determining the presence and concentration of one substance in a mixture, which method automatically compensates for variations in the concentration of other components of the mixture and yields a measurement of the desired substance which is insensitive to the other mixture variations.

A further object of this invention is to provide a method and apparatus for simply, instantaneously, and continuously measuring the concentration of blood in eggs.

Another object of this invention is to provide a method and apparatus for determining the presence and concentration of blood in eggs, which method automatically compensates for variations in the concentration of other components of the egg and yields a measurement of the blood concentration which is insensitive to the other egg component variations.

Still another object of this invention is to provide a method and apparatus for simply, instantaneously, and continuously measuring the concentration of one substance in a mixture.

A further object of this invention is to overcome the objections to prior methods and apparatus.

Other objects and advantages of this invention will become apparent as this discussion proceeds and when taken in conjunction with the following claims and drawings in which;

FIGURE 1 shows a functional block diagram useful for explaining in a general sense the operation of apparatus embodying the concepts of the present invention.

FIGURE 2 shows a schematic diagram of one embodiment of apparatus made in accordance with the teachings of this invention; and FIGURE 3 shows a schematic diagram of an apparatus for the detection of blood in eggs made in accordance with the teachings of this invention.

Before turning to a detailed description of the method and apparatus embodying this invention, it is believed that an explanation of the principles involved will facilitate an understanding of the invention. Consider a mixture containing a plurality of light absorbing substances. If one of the substances in the mixture has a well-defined absorption band whose spectral location is unique (that is, if the other substances in the mixture do not have absorption bands overlapping or interfering with the absorption band associated with the substance of interest) then a well-known principle provides a correlation between the amount of light absorbed and the concentration of the chosen substance. This is the Bouguer or Lambert-Beer law. A simple measurement of the total absorption in the given absorption band in this case provides a measure of concentration. However, many mixtures exist for which it is desirable to determine concentrations of constituents by absorption measurements, and in which convenient unique absorption bands for each substance in the mixture do not exist. Rather the substances exhibit absorption properties which overlap in wavelength, and make impossible any direct measurement of the effect of any one of the constituents in the mixture. This invention provides a method and apparatus for the solution for the concentration of a single chosen constituent using a linear equation.

The general solution for the concentrations of the constituents present in a mixture in terms of the measured spectral transmissions requires the solution of a set of simultaneous logarithmic equations. While such a solution can be obtained by lengthy calculations, such a process would be time consuming and difficult. This invention provides means for solving, not for the general solution mentioned above, but of a simplified linear equation based on an approximation to be discussed below.

One form of the Bouguer law of absorption is given by:

$T = t^c$, where $T$ = the fractional transmission of an absorbing substance and is defined as the ratio of transmitted light intensity to incident light intensity;

$c$ = the concentration of the absorbing substance;

$t$ = the fractional transmission coefficient for a unit quantity of the absorbing substance.

Then taking logarithms yield $\log T = c \log t$.

If more than one absorbing constituent is present in a mixture, then the Bouguer law becomes for $n$ constituents:

$$T = t_1^{c_1} t_2^{c_2} t_3^{c_3} \ldots t_n^{c_n}, \text{ and}$$

$$\log T = c_1 \log t_1 + c_2 \log t_2 + \ldots + c_n \log t_n, \text{ or}$$

$$\log T = \sum_{i=1}^{n} c_i \log t_i.$$

This logarithmic equation contains $n$ unknown quantities $(c_1, c_2, \ldots c_n)$, with constant coefficients characteristic of the materials $(\log t_1, \log t_2, \ldots, \log t_n)$. Thus a solution for the concentrations or for a particular concentration $(c_i)$ requires $n$ such equations. These can be obtained by measuring the mixture transmissions (T) at $n$ different wavelengths. The resultant set of $n$ equations in $n$ unknowns can be represented by:

$$\log T_j = \sum_{i=1}^{n} c_i \log t_i, j \quad (1)$$

where $j = 1, 2, \ldots, n$.

Any such set of $n$ linear equations can be shown (by Cramer's rule) to have a solution of the form:

$$c_i = \sum_{j=1}^{n} A_j \log T_j$$

where $A_j$ = a product of certain $\log t_i, j$ terms (see Cramer's rule) and is a constant for given materials.

If we approximate $\log T$ by a linear equation with constant coefficients $(a, b)$ of the form $\log T_j = a_j T_j + b_j$, then the obove Cramer's rule solution becomes:

$$c_i = \sum_{j=1}^{n} A_j (a_j T_j + b_j) = \sum_{j=1}^{n} a_j A_j T_j + A_j b_j$$

which can be expressed more concisely as:

$$c_i = \sum_{j=1}^{n} W_j T_j + K \quad (2)$$

where $W_j$ represents a signed weighting constant associated with the wavelength at which $T_j$ is measured, and is determined by the optical properties of all the substances present in the mixture, and $K$ represents an additive constant.

Formula 1 is a set of $n$ logarithmic equations in $n$ unknowns.

Formula 2 is a linear equation with constant coefficients in one unknown which has been obtained from Formula 1 at the cost of an approximation. This approximation may sometimes limit the accuracy of compensation for the spectral interference due to other constituents in the mixture. This invention, then, provides for implementation of Formula 2.

Regardless of the origin or derivation of Formula 2, it has been found experimentally that accurate concentration measurements can be obtained by implementing this formula for the case of a signle constituent in a mixture of constituents having overlapping absorption bands. Two analytical problems to be discussed remain: first, the choice of appropriate measuring wavelength bands, and second, the assignment of weighting ($W_j$) values to each of the measuring bands employed.

Useful criteria follow for the selection of the measuring wavelength bands. While they may provide increased efficiency, they should not be regarded as limiting the scope or application of this invention. First, it is desirable that the measuring wavelength bands should be those which are either transmitted relatively strongly or relatively weakly by the substance of interest. Second, an effort should be made to choose wavelength bands such that the transmission coefficients for unit quantities of the other substances in the mixture remain substantially constant over these chosen wavelength bands. Third, if the mixture contains a large number of substances, wavelength bands should be chosen such that the transmittance of the mixture is strongly influenced only by the substance of interest and as few other substances as is possible. A careful choice here may help to reduce the required complexity of the filtering means. Fourth, regard should be given to the spectral sensitivity of the radiation sensors. Fifth, if several different chemical substances are known always to occur in a constant proportional interrelationship, this group of substances may be treated as one constituent, or if several different substances are known to exhibit similar spectral behavior in a chosen spectral region, these also may be treated as one constituent After the appropriate measurement bands have been chosen, the relative weighting values ($W_j$) must be assigned. This can be done as follows:

First, consider the case where the mixture contains $m$ constituents in which the concentration of the $k$th constituent is desired.

We have from Formula 2:

$$c_k = W_1 T_1 + W_2 T_2 + \ldots + W_m T_m + K$$

To evaluate the various W's and K, we introduce a known concentration of $c_k$ and particular concentrations of each of the other constituents. Then we measure T at each of the $m$ wavelengths chosen, as for example, by the previously stated criteria. Thus we have known values for $c_k$, and $T_1, T_2, \ldots T_m$.

We then repeat the same process $m+1$ times employing different concentrations each time, such that each equation resulting is linearly independent of the other equations. (That is, so that the transmission $T_j$ of any one mixture cannot be expressed as a linear combination of the transmissions of the other mixtures).

We now have $m+1$ equations in $m+1$ unknowns ($W_1, W_2, \ldots W_m, K$). These simultaneous equations can be solved for the $W_j$ and $K$. This completes the determination of the constants in Formula 2.

A brief description of this invention follows in which reference is made to the functional schematic diagram shown in FIGURE 1.

A source 10 provides radiant energy such as light which is directed through a suitable aperture and lens arrangement, not shown toward a sample 12. Said energy is transmitted through or reflected from the sample and is divided into two beams by a beam-splitter 14. Each of the filtering means 16 and 18 selects a finite set of narrow wavelength bands from one of the two beams. Weighting means 20 and 22 control the relative amounts of light to be passed in these narrow wavelength bands, and in effect establish the relative values required by the $W_j$ coefficients. The weighting means may be in the form of apertured members positioned in the beams in front of or behind the filtering means, as will be described; or the weighting means may be incorporated in the source 10, in the filtering means themselves, or in subsequent radiation sensors or in circuitry associated therewith, as will be described. Radiation sensors 24 and 26 receive the radiation from the two beams and convert said radiation into signals proportional to the intensities of the two beams, and in effect generate signals proportional to two sums of terms of the form $W_j T_j$. Difference means 28 compares said signals and transmits a signal proportional to the difference between said intensities. Means 30 is provided for adding a constant signal K to said difference signal.

FIGURE 2 illustrates a schematic diagram of one embodiment of apparatus made in accordance with teachings of this invention. A radiation source 40 provides light or other radiation. It is desirable to have a source of light which has a high intensity distribution over the entire frequency spectrum to be examined. A sample 42, consisting of a mixture of substances, is interposed in the path of the light from the source 40. The concentration of one of the constituents of the mixture is to be determined by the apparatus disclosed in this invention. Light passes from the sample 42 through an aperture or entrance pupil 44 which serves to limit the light entering the rest of the system to light which has passed through the sample and to assist in collimation. A lens 46 collimates the light from the entrance pupil 44 into a parallel beam, and a beam-splitter 48 divides the collimated radiation into two parallel beams 50 and 52 respectively. Beam 50 proceeds through apertures 54 and 56 which determine and control the amount of light which will impinge upon band pass filters 58 and 60. It is to be understood that apertures 54 and 56 can be adjusted individually such that the amount of light impinging upon a filter is under the control of the operator. The beam 50 having passed through band pass filters 58 and 60 is condensed by lens 62 onto a radiation detector 64 such as a photocell. The second beam 52 proceeds from the beam-splitter 48 through adjustable apertures 66, 68 and 70 through band pass filters 72, 74 and 76 and is condensed by lens 78 onto a second radiation detector 80 or photocell. The electrical outputs from photocells 64 and 80 are applied to the ends of a resistor 82 having an adjustable center tap 84 connected to electrical ground 86. Connected across resistor 82 and in parallel with the resistor 82 is a volt meter 88 in series with a battery 90.

After the optically significant constituents of the mixture have been identified and a set of suitable wavelengths bands has been chosen, the weighting coefficients ($W_j$) are evaluated. It will be found in the usual case that some of the weighting coefficients are positive numbers while others are negative numbers. The filters passing those wavelengths which have positive weighting coefficients are grouped together in one beam and the filters passing wavelengths which have negative coefficients are grouped together in a second beam. Thus, in FIGURE 2, the fact that filters 58 and 60 are combined in one of the two beams indicates that the weighting coefficients associated with the chosen wavelengths passed by the filters 58 and 60 have been found to have the same algebraic sign. Similarly, the fact that filters 72, 74 and 76 are combined in the second beam indicates that the weighting coefficients associated with the wavelength bands passed by the filters 72, 74 and 76 have all been found to have the opposite algebraic sign. As has been described above, each filter has an adjustable aperture associated with it which limits the amount of light impinging upon the filter. This aperture is used to adjust the value of the weighting coefficient applicable to the associated filter. However, it should be noted that weighting is not confined to the action of the adjustable aperture, since all the optical components in the system contribute to the weighting. The source has a unique radiation spectrum which may not provide the same intensity at all wavelengths; this tends to weight certain wavelengths more heavily with respect to certain other wavelengths. Apertures, lenses, beam-splitters, etc., all contribute alterations in the radiation spectral distribution from the source and add components to the total weighting achieved. The filters themselves have a weighting action in that they are controllable as to the width of the wavelength pass band and as to the percentage of incident light which will be transmitted through the filter. The photocells or radiation sensors contribute to the weighting in that they have a definite spectral response pattern. The electrical circuitry contributes to the weighting since one group of wavelength bands can be attenuated more than the other. It should be thus clearly understood that weighting occurs throughout the optical system. This invention requires the accurate control of the amount of weighting at each wavelength band. The adjustable apertures 54, 56, 66, 68 and 70 provide controls over weighting which compensate for the other weighting factors and provide the accurate weighting required by this invention. In practice, the adjustable apertures can be set in the following manner:

A sample with known spectral transmission $T_j$ is introduced. The passage of light through all but one of the filters is blocked and the photoelectric current caused by the light passing through the filter is measured. The same process is undertaken for each of the filters used. Then the controllable aperture of each filter is adjusted until the individual photoelectric currents are in the proper proportions for the desired weighting.

The difference between the voltages generated between photocells 64 and 80 is taken by applying the photocell outputs across resistor 82. The difference between these voltages is measured by means of the voltmeter 88 placed in parallel with the resistor 82. A battery 90 which generates an additive potential K is connected in series with the voltmeter 88. The voltage of the battery provides the additive constant K.

Thus, the apparatus disclosed is in effect an electro-optical analog computer since it measures optical transmissions $T_j$ at a plurality of wave lengths, weights them optically with weighting coefficients $W_j$, converts them into electrical voltages, takes the difference between two groups of the quantities ($W_j T_j$), and adds a constant K.

In the following, an apparatus for the detection of blood in eggs is described as one example of a practical problem which is solved by an apparatus of the form heretofore described. FIGURE 3 is a diagrammatic view of such an egg-blood detector.

A radiation source 100 provides light or other radiation. A sample (egg) 102 consisting of a mixture of substances is interposed in the path of light from the source 100. The concentration of blood, one of the constituents of the egg, is to be determined by the apparatus disclosed. Light passes from the sample 102 through an aperture or entrance pupil 104 which serves to limit the light entering the rest of the system to light which has passed through the sample and to assist in collimation. A lens 106 collimates the light from the entrance pupil 104 into a parallel beam, and a beam-splitter 108 divides the collimated radiation into two parallel beams 110 and 112 respectively. Beam 110 proceeds through aperture 114 which determines and controls the amount of light which will impinge upon band pass filter 116. It is to be understood, that aperture 114 can be controlled such that the amount of light impinging upon the filter 116 is under the control of the operator. The beam 110 having passed through filter 116, passes through supplementary filter 118. The supplementary filter 118 serves to confine the radiation passed by the filter 116 to a single band of wavelengths. This is necessary since available band pass filters transmit not only the desired wavelength band, but also other undesired side bands. The beam 110 having passed through filters 116 and 118 is condensed by lens 120 onto a radiation detector such as a photocell 122. The second beam 112 proceeds from the beam-splitter 108 through controllable apertures 124 and 126, through band pass filters 128 and 130 and supplementary filters 132 and 134 and is condensed by lens 136 onto a second radiation detector or photocell 138. The electrical signals from photocells 122 and 138 are applied to difference detector 140. The electrical signal from difference detector 140, a voltage corresponding to the difference between the outputs of photocells 122 and 138, is transmitted to an amplitude discriminator 142 which rejects voltage differences below a particular value. This rejection of small signals is desirable so that minute differences between the outputs of photocells 122 and 138, corresponding to negligible quantities of blood in the sample egg, will not be sufficient to cause rejection of the sample egg. From the amplitude discriminator 142, a signal indicating a sufficient concentration of blood in the sample egg so that the egg should be rejected is transmitted to an actuator 144, which mechanically rejects any undesired egg from the egg conveyor 146 while passing desired eggs.

To clarify the choices of the wavelength measuring bands used and the values or weights assigned to each filter, a detailed analysis of the procedures followed is given.

The first determination which must be made is which variables are involved in detecting blood in eggs. The first variable is blood which must be considered as a single variable. Other optically active constituents of the egg mixture include albumen, shell, brown coloring in shell, and yolk color. Thus we have at least five constituents in the egg mixture. Referring to the basic apparatus, this would seem to require the use of five separate wavelength measuring bands. However, the egg-blood detector of FIGURE 3 only uses three such measuring bands. This reduction is made possible by grouping variables in accordance with principles outlined above. Details and justification of the groupings will become apparent below.

The first grouping made is the choice of the whole (bloodless white) egg as one of the constituents. Provided the criteria concerning constant proportional relationship is approximately satisfied, the entire mixture may be considered as a single constituent. In the case of the egg-blood detector, a further reason exists for the choice of whole egg as a single constituent. In addition to its transmittance properties, an egg has properties of an integrating sphere due to its ovoid shape and to the reflective properties of its yolk and shell. The compensation required for these integrating sphere properties provides an additional reason for the selection of whole eggs as one of the chosen constituents.

The second grouping made was that of white shell density variations and albumen quantity variations. It has been found that at wavelengths longer than 550 m$\mu$, the criterion requiring similar spectral behavior in a certain spectral region is satisfied by white shell and albumen in that both are approximately linear functions of wavelength in the region between 550 m$\mu$ and 625 m$\mu$. We have denoted this grouping as linear variables.

The last constituent or variable is brown shell color, which is considered individually.

Thus we have effectively reduced the five variables to four; blood, whole egg, linear variables, and shell color. These four variables are reduced to three in the instrument; an explation of this further reduction follows and becomes apparent when the necessary weighting values for each variable are chosen.

It is first necessary to choose the location of the measuring wavelength bands. The principles stated supra provide guides. The first principle states that the measuring wavelength bands should be those which are either transmitted relatively strongly or relatively weakly by the substance of interest. Within the desired operating wavelength range, (550 to 625 m$\mu$) blood absorption is particularly strong at 577 m$\mu$ and relatively weak at 560 m$\mu$ and above 600 m$\mu$ (600 m$\mu$ to 625 m$\mu$). The other principles also operate favorably at these wavelengths. We thus choose 577 m$\mu$, 560 m$\mu$, and, for reasons to be explained later, 607 m$\mu$.

From experimentally determined data, we obtain the following table of transmission factors ($t_{i,j}$), omitting for the moment any consideration of the linear variables;

|  | 560 m$\mu$ | 577 m$\mu$ | 607 m$\mu$ |
| --- | --- | --- | --- |
| Whole Egg | .0029 | .0041 | .0068 |
| Blood | .781 | .598 | 1.000 |
| Brown Shell | .361 | .437 | .570 |

Our basic formula (Formula 2) is:

$$c_i = \sum_{j=1}^{n} W_j T_j + K$$

We find experimentally that setting $K=0$ yields results sufficiently accurate for the purpose and serves to simplify the electronic circuitry. Thus we have $$c_{\text{blood}} = W_1 T_1 + W_2 T_2 + W_3 T_3$$

as our instrumental equation, in which we must specify $W_1$, $W_2$, and $W_3$.

If we consider the experimental data tabulated above for a clear white egg (without any blood content), we obtain the following instrumental equation:

$$.0029 W_1 + .0041 W_2 + .0068 W_3 = 0$$

If we consider the experimental data for a clear brown shell egg (without any blood content), we obtain:

$$.361(.0029) W_1 + .437(.0041) W_2 + .570(.0068) W_3 = 0$$

Since the introduction of the brown shell factor introduces spectral variations tabulated above relative to whole white egg, therefore $T =$ (brown shell factor) $\times$ (whole white egg factor).

If we consider the experimental data for a white egg containing an arbitrarily defined unit quantity of blood, we obtain:

$$.0029(.781) W_1 + .0041(.598) W_2 + .0068(1.000) W_3 = 1$$

Since the introduction of blood factors introduces spectral variations tabulated above relative to whole white egg, therefore $T =$ (blood factor) $\times$ (whole white egg factor).

Solution of these simultaneous equations yields:

$$W_1 = 830, W_2 = -930, W_3 = 200$$

We have now evaluated the $W_j$'s in our desired instrumental equation:

$$c_{\text{blood}} = 830 T_1 - 930 T_2 + 200 T_3$$

The algebraic signs in this equation indicate that wavelength bands $\lambda_1 = 560$ and $\lambda_3 = 607$ m$\mu$ should be grouped together and that wavelength band $\lambda_2 = 577$ m$\mu$ should be used separately.

Let us now consider the transmission factors ($t_{i,j}$) for the following variables:

|  | 560 m$\mu$ | 577 m$\mu$ | 607 m$\mu$ |
| --- | --- | --- | --- |
| Whole Egg | .0029 | .0041 | .0068 |
| Blood | .781 | .598 | 1.000 |
| Linear Variables | $a+560b$ | $a+577b$ | $a+607b$ | where $t_{\text{linear variables}} = a + b\lambda$ (i.e., a linear equation in wavelength with coinstant coefficients). From Formula 2 with $K=0$ (as before) we have:

$$c_{\text{blood}} = W_1 T_1 + W_2 T_2 + W_3 T_3$$

If we consider a clear white egg, we will obtain, $$.0029 W_1 + .0041 W_2 + .0068 W_3 = 0$$

If we consider a clear egg (unbloody) with a change in the linear variable factors, we obtain, $$.0029(a+560b) W_1 + .0041(a+577b) W_2 + .0068(a+607b) W_3 = 0$$

Since the introduction of linear variable factors introduces spectral variations tabulated above relative to whole white egg, therefore $T =$ (linear variable factor) $\times$ (whole white egg factor).

If we consider a whole white egg containing a unit quantity of blood, we obtain:

$$.0029(.781) W_1 + .0041(.598) W_2 + .0068(1.000) W_3 = 1$$

Since the introduction of the blood factor introduces spectral variations tabulated above relative to whole white egg, therefore $T =$ (blood factor) $\times$ (whole white egg factor).

Solution of these simultaneous equations yields $$W_1 = 840, W_2 = -930, W_3 = 200$$

We have now evaluated the $W_i$'s in our desired instrumental equation:

$$c_{blood} = 840T_1 - 930T_2 + 200T_3$$

Thus, the choice of 560, 577, and 607 m$\mu$ as the three measuring wavelength bands yields substantially the same weighting coefficients and instrumental equation for all of the variables considered. The fact that the instrumental equations are substantially the same means that the choice of these three wavelength measuring bands (560 m$\mu$, 577 m$\mu$, 607 m$\mu$) compensates for both linear variables and shell color while detecting blood in whole egg, and that we need only three measuring wavelength bands to handle four variables.

The adjustable apertures are set to provide the weighting as required by the instrumental equation following the general method given above.

A sample egg with known $T_1$, $T_2$, and $T_3$ is introduced. Two of the apertures are blocked and the photoelectric current caused by the light passing through the third filter is measured. The same process is repeated for each of the other filters. Then the controllable aperture of each filter is adjusted until the individual photoelectric currents are in the proportion, $830T_1 : -930T_2 : 200T_3$.

Thus, following the general method described above, we have determined the design of an instrument which will detect the presence of blood in whole egg and which will be insensitive to linear variables and shell color.

Although I have described and illustrated my invention in a preferred form, it is to be understood that the present disclosure has been made only by way of example and that numerous changes in construction may be resorted to without departing from the spirit and scope of the invention as hereinafter claimed.

For example, it is to be understood, that while the preferred embodiment of my invention, as described and illustrated, teaches the use of two spatially separated beams of radiant energy each of said beams being associated with a separate sensor element, a fully equivalent system could be devised, using one sensor, which could alternately observe the radiation from each of the two beams. Suitable means could then be provided for comparing the intensities of the two temporally separated beams. Such an apparatus is disclosed in co-pending application Serial Number 544,131 entitled, "Detecting Apparatus."

I claim:

1. An egg bloodspot detector having means for conveying sample eggs into position for blood concentration determinations comprising a source of energy, means for selecting a portion of said energy and for transmitting said selected portion, a beam-splitter responsive to said selected portion for dividing said selected portion into two separate beams, a filter interposed into the path of the first of said two beams for selecting from said beam a first wavelength band having a particular spectral location and bandwith, a pair of filters interposed into the path of the second of said beams for selecting from said second beam second and third wavelength bands, each of said second and third bands having a particular spectral location and bandwidth, a plurality of apertured members each associated with a different one of said bands for providing a predetermined weighting in each of the different wavelength bands, sensor means responsive to the weighted energy passing through the apertured members for converting such weighted energy into electrical signals having characteristics related to such weighted energy, comparator means coupled to said sensor means and responsive to the electrical signals for comparing said electrical signals and providing an output signal dependent on the comparison, means coupled to said comparator means for selecting the output signal therefrom having particular characteristics, and means coupled to said selecting means and responsive to said selected output signal for obtaining a removal of the sample egg from the conveying system.

2. Apparatus for detecting the presence and concentration of one substance in a mixture comprising: first means for producing energy, means responsive to energy from said first means for dividing said energy into two beams, first filtering means interposed in the path of the first of said two beams for selecting from the first beam at least one radiation wave length of a particular spectral location and bandwidth, second filtering means interposed in the path of the second of said two beams for selecting from the second beam at least one radiation wavelength of a second particular spectral location and bandwidth, sensor means for receiving each of said first and second beams and for convering the energy contained therein into respective electrical signals having characteristics respectively related to such energy, electrical circuit means coupled to said sensor means and responsive to the electrical signals therefrom for comparing said electrical signals and providing an output signal dependent on such comparison, weighting means included in at least one of the aforesaid means for providing a pre-determined weighting effect on at least one of said respective electrical signals, and means in said electrical circuit means for adding a constant electrical signal to said output signal.

3. Apparatus for detecting the presence and concentration of one substance in a mixture comprising: means for producing a first beam of energy of at least one radiation wavelength of a first particular spectral location and bandwidth and for producing a second beam of energy of at least one radiation wavelength of a second particular spectral location and bandwidth, sensor means for receiving each of said beams and for converting the energy contained therein into respective electrical signals having characteristics respectively related to such energy, electric comparator circuit means coupled to said sensor means and responsive to the electrical signals therefrom for comparing said electrical signals and for providing an output signal dependent upon such comparison, weighting means included in at least one of the aforesaid means for providing a pre-determined weighting effect on at least one of said respective electrical signals, and means included in said electric comparator circuit means for adding a constant electrical signal to said output signal.

4. In an egg blood spot detector having means for conveying sample eggs into position for blood concentration determines comprising a source of energy, an iris and a collimating lens for selecting a portion of said energy and for transmitting said selected portion in a beam, a beam-splitter responsive to said beam for dividing said beam into separate beams, a set of filters interposed into the paths of each of said separate beams for transmitting a set of wavelength bands, each of said wavelength bands having a particular spectral location and bandwidth, a plurality of apertured members interposed in respective ones of said separate beams for providing a pre-determined weighting of the energy in said set of wavelength bands, a pair of photo-cells interposed in respective ones of said separate beams and respectively responsive to the weighted energy therein for converting such energy into electrical signals having characteristics related to such weighted energy, circuit means coupled to said photo-cells and responsive to said electrical signals for comparing the same and for producing an output signal in response to such comparison, means coupled to said circuit means and responsive to said output signal when said output signal exhibits a particular characteristic to remove from the conveying system the egg providing the output signal of said particular characteristic.

(References on following page)

References Cited in the file of this patent

UNITED STATES PATENTS

| | | |
|---|---|---|
| 2,436,262 | Miller | Feb. 17, 1948 |
| 2,547,212 | Jamison et al. | Apr. 3, 1951 |
| 2,620,444 | Heigl et al. | Dec. 2, 1952 |
| 2,678,581 | Reisner | May 18, 1954 |
| 2,700,321 | Brandt et al. | Jan. 25, 1955 |
| 2,737,591 | Wright et al. | Mar. 6, 1956 |
| 2,823,800 | Bliss | Feb. 18, 1958 |

OTHER REFERENCES

"Poultry Science," vol. 32, No. 2, March 1953.